United States Patent [19]
Baumann

[11] Patent Number: 5,441,080
[45] Date of Patent: Aug. 15, 1995

[54] ECCENTRICALLY ROTATABLE SLEEVE TYPE 3-WAY VALVE

[76] Inventor: Hans D. Baumann, 32 Pine St., Rye, N.H. 03870

[21] Appl. No.: 312,225

[22] Filed: Sep. 26, 1994

[51] Int. Cl.6 ............................................. F16K 11/04
[52] U.S. Cl. .................. 137/625.46; 137/625.44; 251/258
[58] Field of Search .............. 137/863, 625.46, 625.44, 137/875; 251/901, 258

[56] References Cited
U.S. PATENT DOCUMENTS

| | | | |
|---|---|---|---|
| 2,431,593 | 11/1947 | Strike | 251/258 X |
| 2,534,577 | 12/1950 | Courtot | 251/258 X |
| 3,165,119 | 1/1965 | Hewitt | 137/625.21 |
| 5,310,162 | 5/1994 | Baumann | 251/258 |

Primary Examiner—John C. Fox

[57] ABSTRACT

The Eccentrically Rotatable Sleeve Type Three-Way Valve is comprised of a housing having a central, vertical bore retaining therein a flexible, tubular sleeve whose central portion can be eccentrically motivated towards or away from two opposite valve seats which are located perpendicularly towards and at the center of said vertical bore, by a core element positioned inside said sleeve and which is capable of being radially displaced by a stem having eccentric cam means and wherein said sleeve is sealingly engaged towards the housing bore by deformable seals motivated by bonnets and wherein said sleeve can guide fluid entering from a third port towards and through either of the two valve seats.

4 Claims, 1 Drawing Sheet

ECCENTRICALLY ROTATABLE SLEEVE TYPE 3-WAY VALVE

This application describes and claims further improvements over my prior invention U.S. Pat. No. 5,310,162, filed on Apr. 12, 1993.

BACKGROUND OF THE INVENTION

This invention relates to packless control valves used to control the flow of fluid in a piping conduit. A typical example of a packless valve that may be used for this purpose is a diaphragm type valve as illustrated, for example, in my U.S. Pat. No. 4,609,178. These valves provide good closure means and are reasonably compact. However, since the diaphragm acts both as a closure member and a stem seal, these diaphragms must be fairly large and are typically two to three times the diameter of the valve orifice. The result is a requirement for substantial actuating forces to overcome the forces created by the diaphragm area times fluid pressure. If the diaphragm is made out of a plastic, such as PTFE (Polytetrafluoroethylene), routine repeated closure of such a diaphragm is not guaranteed due to the high mechanical stress imposed upon by the large flexible movement required for such a diaphragm. Another disadvantage of a diaphragm valve is their highly streamlined flow passage which can lead to cavitation and wear under high fluid velocities. Finally, the body size of a typical diaphragm valve is fairly large in comparison to the port opening which makes the construction of such a valve fairly expensive.

Three-Way-type ball valves also have been employed. However, these ball valves are neither packless, i.e., they require a stem packing, nor are they crevice free, i.e., suitable for sterile applications.

Globe-type three-way valves have the same disadvantage and, in addition, have nonuniform flow characteristics between the separate ports.

My invention overcomes these and other objections to valves of prior art by using a flexible tube as a closure element and stem sealing device. The flexible tube itself can be made from any commercial elastomeric or plastic, such as sanitary grade silicone rubber, without imposing undue stresses on the material. The relatively small amount of radial displacement of the sealing material requires only moderate actuating forces which leads to substantial cost savings as far as actuating devices are concerned. In comparison to diaphragm valves, which have relatively large areas subject to fluid pressure and, therefore, high stresses, my flexible tube is supported over more than 90% of the exposed area by an interiorly placed mechanical element resulting again in relatively low stress levels, thereby guaranteeing a substantially higher number of life cycles. Another advantage lies in the fact that my sealing tube diameter is only about 65% larger than the valve port diameter, therefore, requiring a relatively small valve housing and valve closure flanges. The fact that the flow path from the common inlet to either of the two ports or seats is identical, assures a noninterrupted and uniform flow characteristic. Finally, my invention provides for a valve that can be utilized in full vacuum without fear of the sealing membrane collapsing under a negative pressure gradient as is the case with typical diaphragm valves. These and other important advantages will be explained more clearly by the following drawings and descriptions.

DESCRIPTION OF THE INVENTION

While the invention will be described in connection with a preferred embodiment, it should be understood that there is no intention to limit the invention to this specific embodiment.

Figure 1:
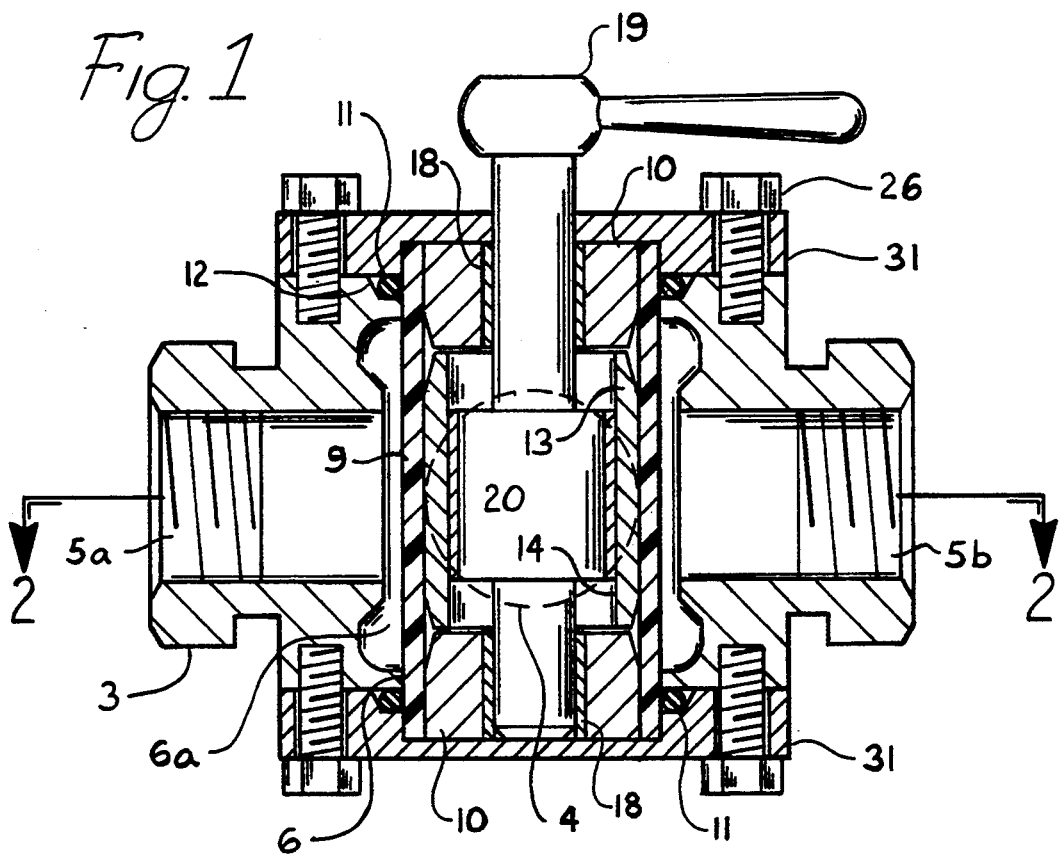
FIG. 1 is a vertical central, cross-sectional view of a preferred embodiment of my invention, where the valve is shown in the mid-stroke position allocating equal flow to either valve seat.
Figure 2:
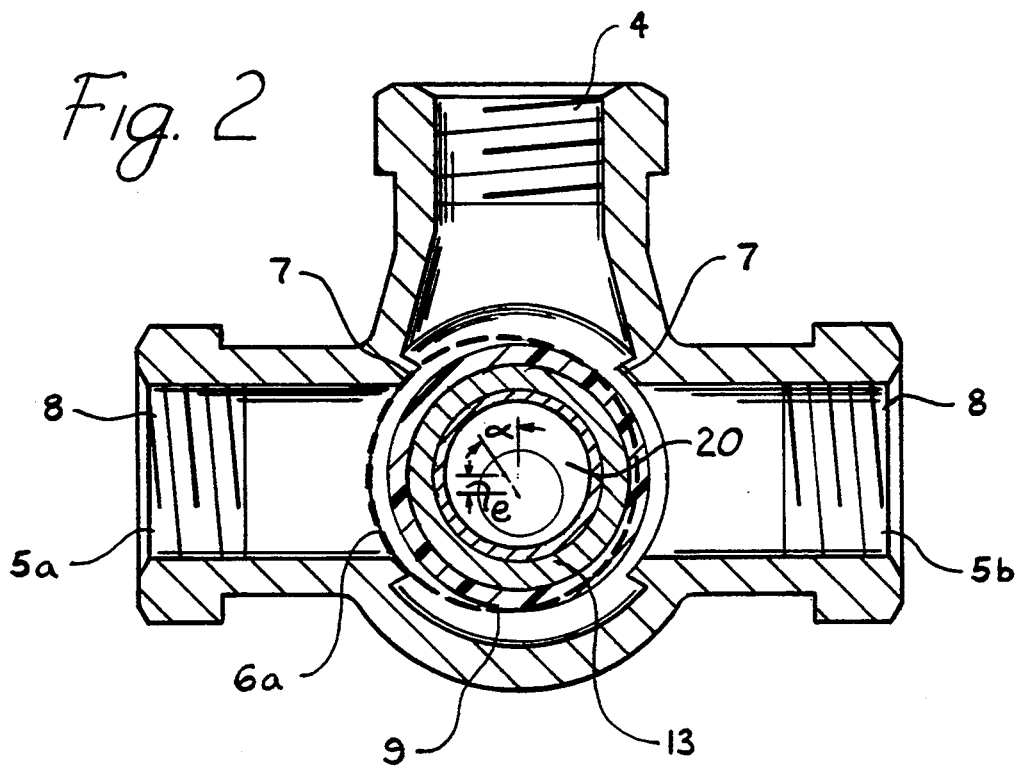
FIG. 2 is a horizontal, cross-sectional view of the device shown in FIG. 1 and following the line 2—2 in FIG. 1.

Referring to FIG. 1, my invention is comprised of the valve housing 3 having an inlet port 4 and two outlet ports 5a and 5b respectively. It should be understood that in order to function properly, inlet port 4 and outlet ports 5a and 5b could easily be reversed and that the choice of location is purely one out of convenience. Valve housing 3 has a central, circular, perpendicular bore 6 and an enlarged opening 6a where the intersection between outlet ports 5a and 5b and opening 6a provides for two cylindrical sealing surfaces 7 each constituting a valve seat. Inlet port 4 and outlet ports 5a and 5b have threaded ends 8 suitable to connect to a fluid containing piping system. Circular bore 6 contains within a flexible tube or sleeve 9 which fits snugly into circular bore 6 and which is supported in the inside by two inserts 10, the latter being held in place by an upper and lower bonnet flange 31. The central interior of sleeve 9 is occupied by a barrel-shaped element 13 having a hollowed center portion 14. Insert 10, furthermore, has a guide bushing 18 guiding therein a valve stem 19 which has a cylindrical central portion 20 whose center is oil-set from the center of stem 19 by a distance "e" shown in FIG. 2. The upper extension of stem 19 is capable of engaging an actuator.

The outer sleeve 9 has to be compressed against the inner surface of bore 6 in order to prevent leakage of fluid from opening 6a to the outside. This is accomplished by using a seal 11 made out of an elastomeric material and motivated inwardly by a chamfered portion 12 in the upper and lower terminating portions of housing 3. In order to accomplish this compression, upper bonnet flange 31 is forced towards housing 3 by means of threaded fasteners 26.

Referring specifically to FIG. 1, here we see stem 19 in the open position, that is, the cylindrical portion 20 is displaced half way towards each outlet ports 5a and 5b thereby having the barrel-shaped element 13 midway between the outlet ports. In this position, fluid entering from inlet port 4 is evenly distributed through each outlet port. Turning stem 19 counter-clockwise by an angular distance $\alpha$ will displace cylindrical portion 20 to the left. This in turn will lead to an eccentric, radial displacement of the flexible sleeve 9 into the dashed position shown in FIG. 2 and which will allow fluid from inlet port 4 to flow between sealing surface 7 and flexible sleeve 9 into outlet port 5b while at the same time closing off outlet port 5a. Upon rotation of the valve stem 19 in the opposite direction, which in turn forces barrel-shaped element 13 to move towards the right, flexible sleeve 9 is forced to make a nutating motion and engages sealing surface 7 of outlet port 5b.

It is necessary to drain the valve opening 6a completely whenever such a valve is used for a sanitary fluid (such as in the food or bioprocessing industry). My invention can accomplish this by placing the valve so that the stem 19 is in the horizontal axis and by placing the axis of inlet port 4 to face downwards. Thus, following the laws of gravity, all the fluid will drain from the valve housing and ports 5a and 5b into the piping attached to inlet port 4.

Numerous modifications can be made to the invention without departing from the spirit of the following claims; for example, portion 20 might have additional bearing means to reduce rotating friction; a valve packing could be added around stem 19 for added protection; a separate seat ring (for example, made from stainless steel) could be added in housing 3 if the latter is made from an inexpensive metal such as cast iron; the shaft itself could be retained in an eccentric relationship towards the axis of bore 6; the non-displaced portion of the sleeve length could be completely retained within the housing bore itself; threaded connections 8 could be replaced by flanges; additional parts can be added, and so on.

Having thus described a typical embodiment, I hereby claim the following features of my invention:

1. Eccentrically rotatable sleeve type three-way valve, comprising a housing having at least one inlet port and two outlet ports and one central opening having a central longitudinal axis and enlarged mid-section and extending essentially perpendicular to said outlet ports, the interface between said outlet ports and the perpendicular central opening constituting valve seats, a flexible sleeve inserted within the central opening, a cylindrical core snugly fitting within said flexible sleeve and extending in width beyond the cross-sectional dimension of said outlet ports, a shaft having an axis of rotation and extending through the length of said central opening and having an eccentric element, said axis of rotation being offset from said central longitudinal axis, said core having a bore cooperatively engaging with the shaft and having suitably configured portions to engage said eccentric element of the shaft and capable of causing the lateral displacement of said core selectively toward either of said outlet ports thereby forcing the central portion of said flexible sleeve to make a complimentary motion and thereby causing the sleeve to contact one of the valve seats to close off and prevent fluid from flowing from the inlet to one of the outlet ports upon sufficient rotational displacement of said shaft, and suitable closure means attached to either terminating end of said central opening, and retaining suitable sealing means there between to prevent the escape of fluid between said central opening and said closure means.

2. Eccentrically rotatable sleeve type three-way valve of claim 1, wherein said eccentric element of the shaft is comprised of a cylindrical central portion extending in diameter over that of said shaft and where the centerline of said cylindrical portion is off-set from that of the shaft.

3. Eccentrically rotatable sleeve type three-way valve of claim 1, wherein each of said closure means is comprised of a flange suitably attached to said valve housing and having a circular opening to snugly engage the upper or lower outer extremity of the flexible sleeve.

4. Eccentrically rotatable sleeve type three-way valve of claim 1, wherein said sealing means constitute O-rings placed between said valve housing and the closure means in order to provide the desired sealing function.

* * * * *